Figure 1:
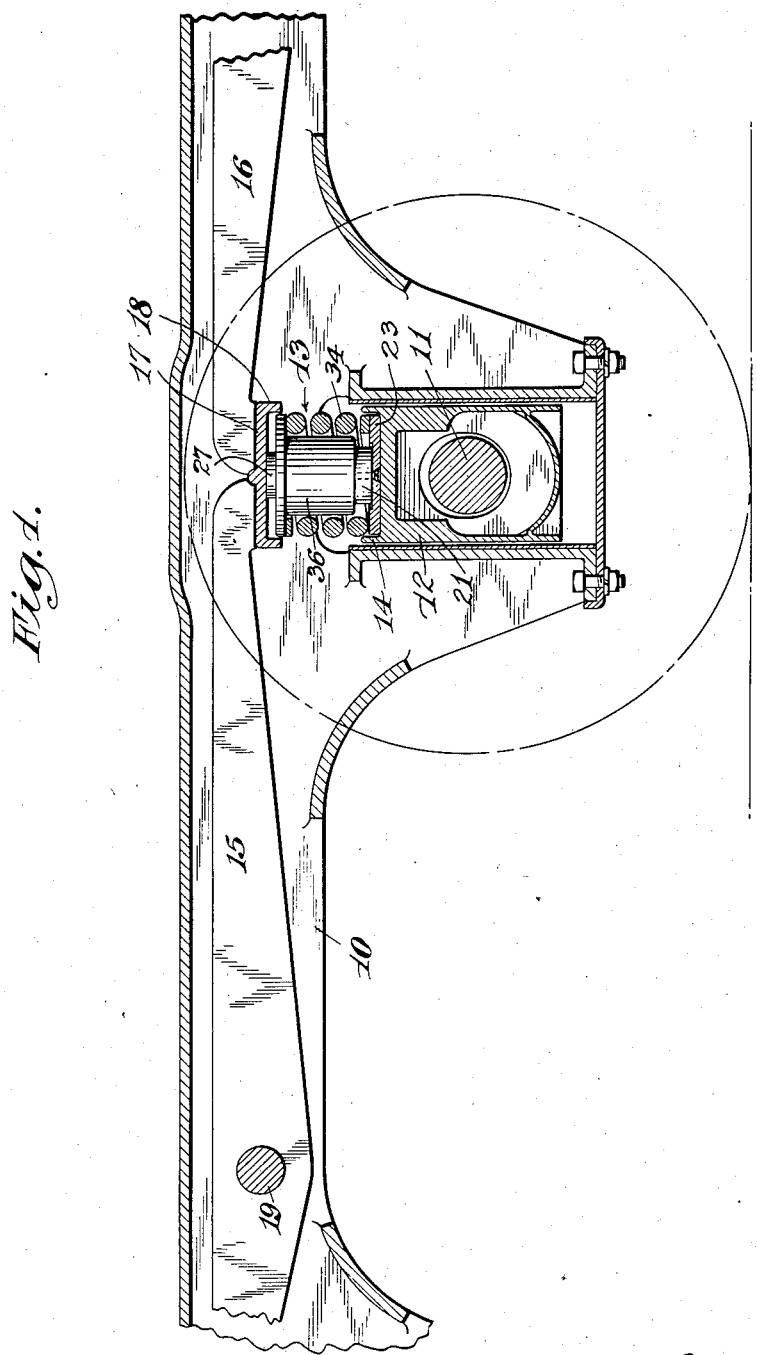

April 12, 1932.  E. H. SCHMIDT  1,853,933
SHOCK ABSORBER
Original Filed Jan. 4, 1927    4 Sheets-Sheet 1

Inventor
Ernest H Schmidt
By his Attorney
Clarence O Kerr

April 12, 1932.  E. H. SCHMIDT  1,853,933
SHOCK ABSORBER
Original Filed Jan. 4, 1927  4 Sheets-Sheet 2
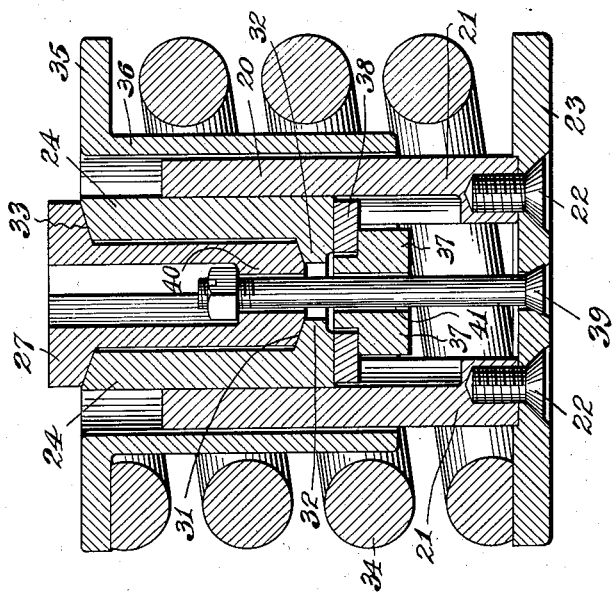
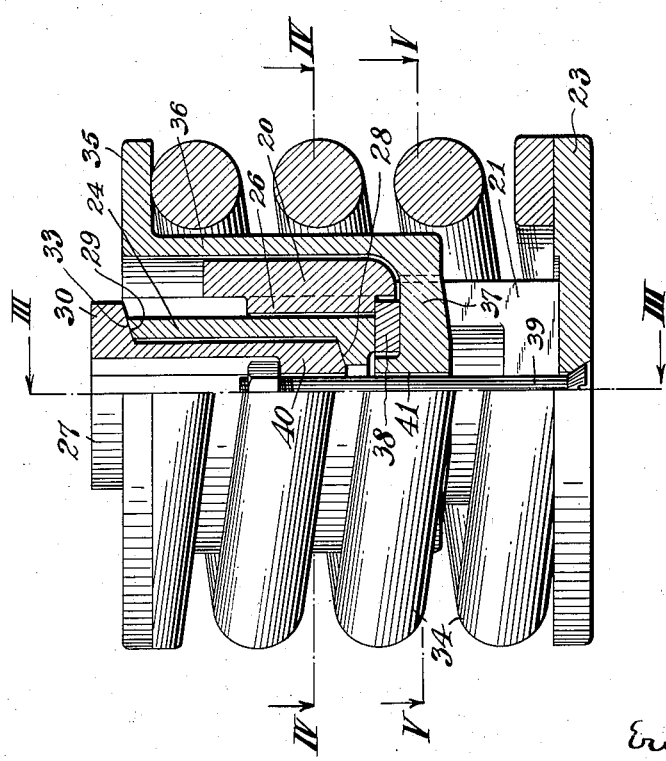
Inventor
Ernest H Schmidt
By his Attorney April 12, 1932. E. H. SCHMIDT 1,853,933
SHOCK ABSORBER
Original Filed Jan. 4, 1927 4 Sheets-Sheet 3
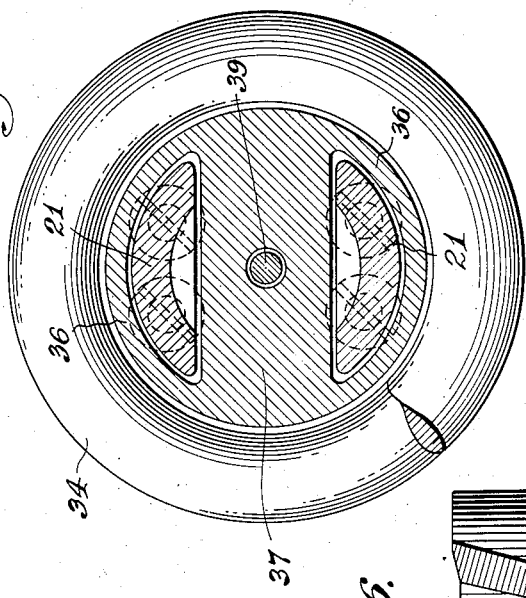
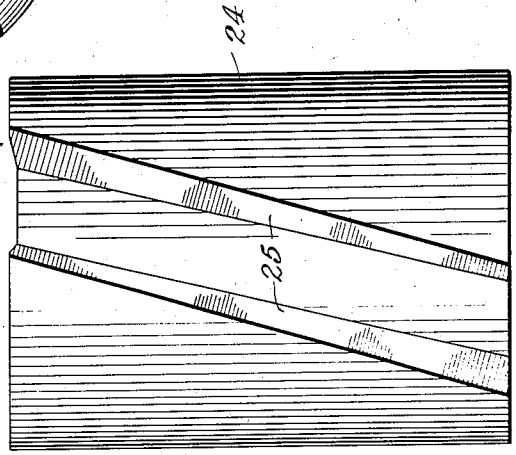
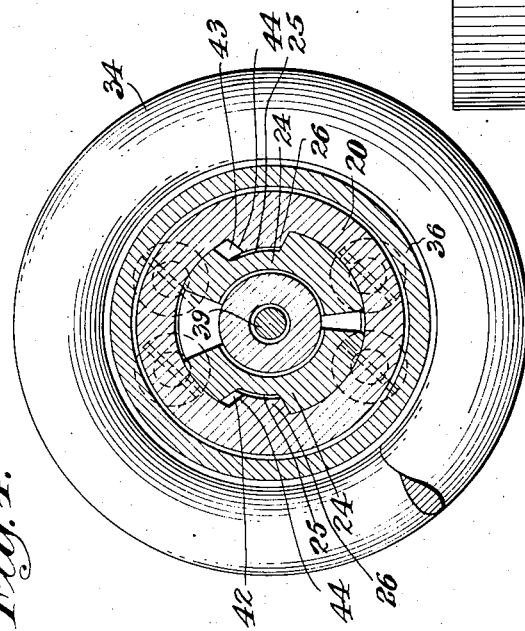
Inventor
Ernest H. Schmidt
By his Attorney
Clarence A Kerr April 12, 1932. E. H. SCHMIDT 1,853,933
SHOCK ABSORBER
Original Filed Jan. 4, 1927 4 Sheets-Sheet 4
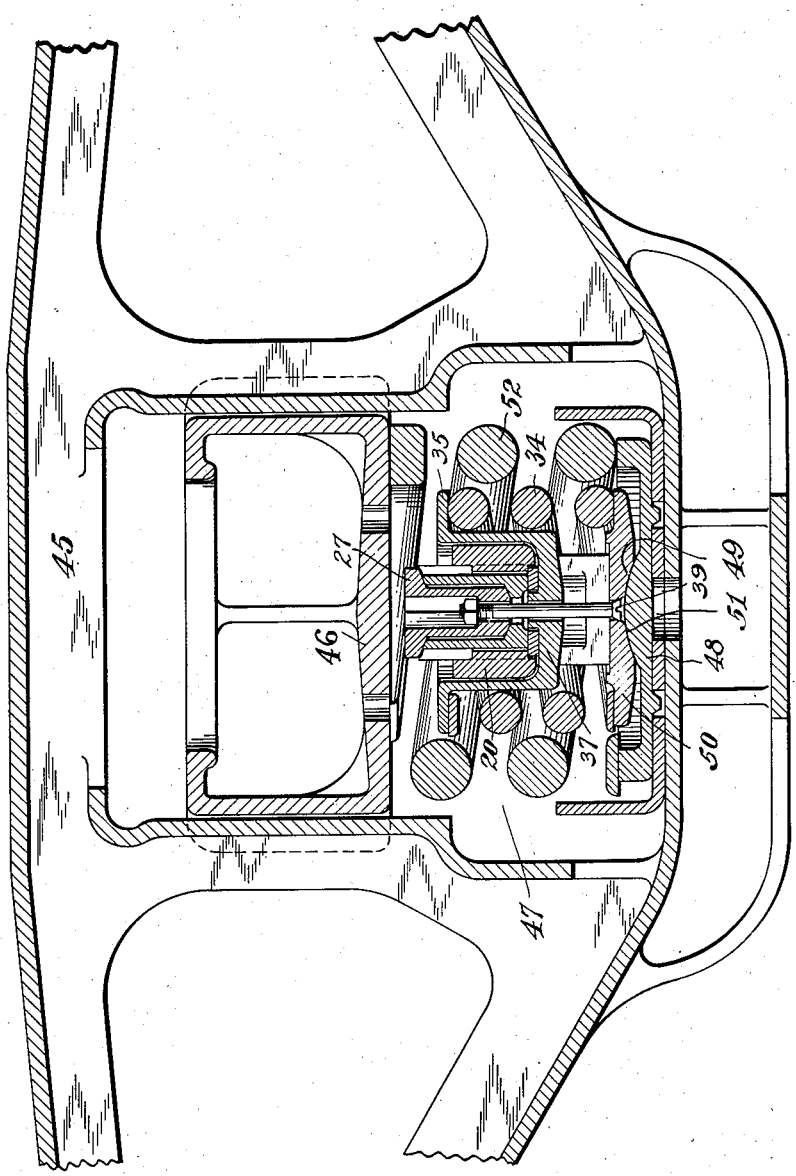
Inventor
Ernest H Schmidt
By his Attorney
Clarence A Perr Patented Apr. 12, 1932

1,853,933

UNITED STATES PATENT OFFICE

ERNEST H. SCHMIDT, OF CLEVELAND HEIGHTS, OHIO, ASSIGNOR TO NATIONAL MALLEABLE AND STEEL CASTINGS COMPANY, OF CLEVELAND, OHIO, A CORPORATION OF OHIO

SHOCK ABSORBER

Application filed January 4, 1927, Serial No. 158,898. Renewed December 4, 1931.

Fig. 1 is a view in vertical section through a portion of the side frame of a passenger truck showing a shock absorber mechanism embodying the invention; Fig. 2 is a view partly in side elevation and partly in vertical section of the shock absorber device shown in Fig. 1 and taken on an enlarged scale; Fig. 3 is a view in vertical section taken on the line 3—3 of Fig. 2; Fig. 4 is a view in horizontal section taken on the line 4—4 of Fig. 2; Fig. 5 is a view in horizontal section taken on the line 5—5 of Fig. 2; Fig. 6 is a view in side elevation of a friction shoe member forming part of the device shown in Figs. 1 and 2; and Fig. 7 is a view in vertical section showing a modified form of the device embodying the invention applied to a freight car truck construction.

My invention relates to stabilizer or shock absorber mechanism capable of application to the trucks of railway cars, the mechanism being particularly useful in preventing bouncing action in the car body such as tends to be produced at cross-overs and at uneven points in the track. The invention is particularly applicable for use with passenger trucks for improving the stability and riding qualities of the cars, and with cars used in fast freight service to prevent damage to fragile goods.

My invention comprises the use of a spiral friction device for use in the truck structure of railway cars, the device being shown, for convenience, in connection with a passenger truck construction and also as applied to a freight car truck. The device includes a hollow friction cylinder having frictional engagement with a plurality of friction shoe members together with wedging members arranged to bring the parts into frictional relation when a spring member surrounding the hollow friction cylinder is compressed. The parts, as a whole, are mounted in a compact relation one within another. All the operative parts of the structure are contained within the axial length of the enclosing weight receiving spring. An angular or helical movement is also provided between the friction cylinder and the friction shoe members to add to the frictional resistance provided by the engagement of parts and also to distribute wear more uniformly and over a greater area of the interengaging parts.

My invention also comprises various other features which I shall hereinafter describe and claim. While the invention has been described and illustrated in connection with railway car trucks, it will be apparent that its utility is not confined thereto.

Referring to the drawings for a more detailed description of the invention, in Fig. 1 there is shown in section a portion of the side frame member 10 of passenger truck. The center axle 11 of the six-wheel truck structure, a part of which is shown, is provided with the usual journal box 12, on top of which rests a stabilizer or shock absorber structure 13 which forms the subject matter of the invention set forth herein. The journal box structure 12 is provided with upwardly extending flanges 14 at its lateral edges which provide a seat in which the stabilizer structure is received and centered in a proper working position. In this type of truck, that portion of the car load, which is designed to be carried by the center pair of wheels on the axle 11, is transmitted thereto from the side frame member 10 by means of equalizer arms 15 and 16. The ends of the equalizer arms bear against the upper side of a cap member 17 which rests on the stabilizer structure 13, the cap member 17 being provided with downwardly projecting flanges 18 which enclose the upper extremity of the stabilizer device. The equalizer arm 15 is shown as pivoted to the side frame structure at 19, the pivotal point of the equalizer arm 16 not being shown.

The stabilizer or shock absorber structure includes a hollow friction cylinder member 20 which is provided with downwardly extending supporting members 21 having a diametrically opposed relation to each other and attached by means of the screws 22 to a base plate 23 forming part of the structural assembly. Within the hollow cylindrical member 20 is mounted a pair of friction shoe members 24, each of which is provided with a helical or angular groove 25 in which is received a radial inwardly extending spiral lug 26 formed integrally with the inner surface of the hollow cylindrical member 20. It will be seen that the relation of the cylindrical friction member 20 and the friction shoe members 24 is such that frictional engagement is effected between the adjacent surfaces of the members and between the spiral lugs of the member 20 and the surfaces of the grooves 25 formed in the friction shoe members 24.

Mounted between the friction shoe members 24 is a tubular wedging member 27 having a wedging surface 28 formed at its lower extremity and an annular friction wedging surface 29 formed on the lower face of an annular flange member 30 formed on the upper end of the wedging member 27. The inclined face 28 formed at the lower end of the wedging member 27 is arranged to engage correspondingly inclined faces 31 forming the upper faces of radial inwardly extending lug members 32 formed on the lower ends of the friction shoe members 24. The upper annular inclined surface 29 of the wedging member 27 engages correspondingly inclined faces 33 forming the upper terminal edges of the friction shoe members 24.

A weight-resisting coil spring member 34 is mounted in enclosing relation to the parts described and bears at its lower end against the base plate 23 previously referred to. On the upper end of the spring 34 an outwardly extending annular flange member 35, which is formed integrally with the upper end of an annular member 36 across the lower end of which a bridging member 37 extends between the downwardly extending supporting members 21 of the hollow friction cylinder 20, is provided. The member 36 forms by this arrangement a connecting structure between the weight-resisting spring 34 and the working parts of the stabilizer device. A washer 38 is interposed between the bridging member 37 of the member 36 and the lower extremities of the friction shoe members 24. A bolt 39 engages with a restricted portion 40 of the tubular wedging member 27 and with the base plate 23, passing through an opening 41, provided for the purpose in the bridging member 37, and functions to hold the parts in assembled relation.

In operation the weight of the load is received on the upper face of the tubular wedging member 27 and tends to force the wedging member downwardly, thereby, through the interconnection of the inclined faces 29—33 and 28—31 exerting a spreading or separating action on the oppositely disposed friction shoe members 24. This action, of course, exerts powerful pressure through the friction shoe members 24 against the inner faces of the hollow friction cylinder 20 and thereby correspondingly increases the frictional engagement of the parts.

The shoe members 24 are caused to move downwardly within the hollow friction cylinder 20 by the downward movement of the wedging member 27, and by reason of the interengagement of the spiral lugs 26 on the friction cylinder member 20 and the helical grooves 25, an angular or rotative movement also is provided between the interengaging cylinder 20 and shoes 24. There is thus provided a compound movement of the parts in response to the action of the wedging member 27 produced by the load which rests thereon.

It will be clear that downward movement of the friction shoes 24 is resisted by the interengagement between the friction shoes and the connecting member 36 which engages the upper end of the load resisting spring 34 and it will be seen that the frictional resistance which is developed between the mutually contacting parts described is added to the resistance of the spring to effectively cushion the downward thrust of the adjacent ends of the equalizer arms 15 and 16 of the truck structure. Under reverse conditions of operation, that is, when the spring 34 acts to restore the parts to a non-compressed condition, the bridge member 37 of the connecting member 36 is raised, bringing about a corresponding lift of the friction shoe members 24 with a reverse angular movement of the shoe members with relation to the hollow friction cylinder 20 and thereby effecting the restoration of the parts to normal position.

A feature of the invention resides in the arrangement of the parts to provide clearances or gaps 42 and 43 between the friction surfaces 44 of the spiral lugs 26 and the adjacent faces of the spiral grooves 25 in the friction shoe members 24. This clearance, which occurs only in the normal and non-compressed condition of the parts, provides for a slight direct downward movement of the shoe members 24 before the angular or helical movement of the shoe begins in a compressing movement of the parts. By thus arranging for the spiral or helical movement to begin only after the clearance has been fully taken up by the straight-line downward movement I provide a relatively soft action during the straight-line travel of the parts for taking up ordinary minor vibrations. When the spiral action comes into play, the friction between the parts builds up rapidly because of the angular twist in the relative movement of the parts, thereby making adequate provision for taking up more substantial shocks, such as are encountered when the truck is passing over a low spot in the track.

It will be seen that the clearance space 42 is smaller than the clearance space 43, as will be seen in Fig. 4 of the drawings. The difference in the clearance spaces provides for the initial rotation of one shoe before the rotation of the other begins. This differential in the action of the two shoes provides for a distribution of the resistance to releasing and results in a more positive and certain release of the gripping action of the parts following the compressing action thereof.

Referring to Fig. 7 of the drawings there is shown an application of the invention to a freight car truck structure. In this figure a portion of a side frame member of the truck is shown at 45 with the bolster being shown in section at 46 and with the stabilizer structure being shown generally at 47. In this form of the invention, the stabilizer structure is so mounted as to have a universal or ball and socket support to provide for both longitudinal and lateral movement of the supported bolster member. This universal mounting includes a base member 48 having a convex seat 49 in which rests a spring seat member 50 having a concave surface 51 which engages the convex surface 49 of the base member 48. In this construction, the stabilizer structure follows that already described in connection with the passenger truck mounting. However, the spring action of the stabilizer is supplemented by the action of a coil spring 52 mounted in enclosing relation to the stabilizer structure and arranged to be compressed between the bolster structure 46 and the base member 48. With this arrangement it will be seen that pressure of the bolster is taken up first by the spring 52 and because of the clearance provided between the top of the stabilizer wedge member 27 and the lower surface of the bolster 46, the stabilizer structure does not come into action until the spring 52 has been compressed to a certain extent. By this arrangement of structure, the large spring 52 takes up all ordinary or relatively minor vibrations while vibrations of greater intensity or magnitude are damped by the friction action of the stabilizer structure.

It will be seen that I have thus provided a stabilizing or shock absorbing structure adapted for use in the truck construction either of passenger cars or of freight cars and characterized by its compactness and general adaptability for use in the restricted space available for the purpose. This compactness is achieved by the mounting of the structure parts in a telescopic or co-extensive arrangement whereby all the parts are located within the longitudinally separated limits of the enclosing spring structure. This compactness of arrangement is an important feature of the invention in that it provides for the location of structure effective for the purpose in a relatively restricted space. By reason of this, I am enabled to replace the ordinary coil spring members heretofore used in this situation by the spring friction shock absorbing devices described herein, thereby adding in a substantial degree to the effectiveness of the stabilizing or shock absorbing function.

Matter disclosed but not claimed herein is claimed in my copending applications Serial Numbers 124.560, filed July 24, 1926, and 249,521, filed January 26, 1928.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a shock absorber structure, a hollow friction member, friction shoe members having frictional engagement with the inner surface of the hollow friction member and movable axially thereof, a load resisting spring member mounted in enclosing relation to said hollow friction member, a connecting member seated on the upper end of the spring and supporting said friction shoe members at their lower ends, and a load receiving member arranged to engage said friction shoe members and to move them axially of the hollow friction member against the pressure of the spring under the pressure of the load.

2. In a shock absorber structure, a hollow friction member, friction shoe members having frictional engagement with the inner surface of the hollow friction member and movable helically thereof, a load resisting spring member mounted in enclosing relation to said hollow friction member, connecting means resting on the upper end of the spring member and supporting said friction shoe members at their lower ends, and a load receiving member arranged to engage said friction shoe members and to move them against the resistance of the spring under the pressure of a load.

3. In a shock absorber structure, a hollow friction member, friction shoe members having frictional engagement with the inner surface of the hollow friction member, interengaging spirally arranged lug and groove members on the interengaging surfaces of the friction shoe members and said hollow friction member, a load resisting spring mounted in enclosing relation to said hollow friction member, a connecting member resting on the upper end of the spring and supporting said friction shoe members at their lower ends, and a load receiving member arranged to engage said friction shoe members and move them with relation to the hollow friction member against the resistance of said spring under the pressure of the load.

4. In a shock absorber structure, a hollow friction member, friction shoe members having frictional engagement with the inner surface of the hollow friction member, interengaging spirally arranged lugs and grooves formed on the interengaging surfaces of the friction shoe members and the hollow friction member, a load resisting spring mounted in enclosing relation to said hollow friction member, a connecting member resting on the upper end of the spring and supporting said friction shoe members at their lower ends, and a load receiving wedging member having telescopic relation to said friction shoe members and arranged to force said friction shoe members outwardly to create pressure against the interengaging frictional surfaces when the wedging member is forced downwardly against the resistance of the spring under the pressure of the load.

5. In a shock absorber structure, a hollow friction member supported in a recess in a truck side frame member, friction shoe members having frictional engagement with the inner surface of the hollow friction member and movable axially thereof, a load resisting spring member mounted in enclosing relation to said hollow friction member, a connecting member resting on the upper end of said load resisting spring and supporting said friction shoe members at their lower ends, a load receiving member arranged to move said friction shoe members axially of said hollow friction member against the resistance of said spring, a load receiving spring member mounted in enclosing relation to said first named spring member and bearing at its upper end against the lower surface of a truck bolster, said last named spring being adapted to hold the bolster normally in a position above and out of contact with said load receiving member whereby minor vibrations are absorbed by the outer spring member and vibrations of greater magnitude are damped by the action of the frictional engagement of the shock absorber parts.

6. In a railway car truck having a load transmitting member and a load receiving member, friction shock absorbing means interposed therebetween and radial equalizing means disposed between said shock absorbing means and one of the aforesaid members to provide for relative lateral movement between the load transmitting and load receiving members.

7. A shock absorber comprising a friction column and friction shoes arranged for frictional engagement therewith, a load receiving member arranged to engage said friction shoes and to move them axially of the friction column, a load resisting spring member mounted in enclosing relation to said friction column and load receiving member, and a connecting member seated on the upper end of the spring and supporting said friction shoes at their lower ends.

8. In a shock absorber structure, a base member, a hollow friction member engaging said base member, friction shoe members having frictional engagement with the inner surface of the hollow friction member and movable axially thereof, a member for supporting said shoes and having openings therein for receiving portions of said friction member, and a load receiving member co-extensive with the friction shoe members and having wedging engagement at both ends of said friction shoe members, said load receiving member acting under the pressure of the load to force the friction shoe members radially outward to exert pressure against the surface of the hollow friction member with which they are in contact.

9. In a railway car truck having a load-transmitting member and a load receiving member, friction shock absorbing means interposed therebetween, and radial equalizing means disposed between said shock absorbing means and one of the aforesaid members to provide for relative lateral movement between the load transmitting and load receiving members regardless of whether the friction shock absorbing means is in operated or unoperated condition.

ERNEST H. SCHMIDT.